Oct. 6, 1959
H. ORNER
2,907,219
REVERSING TRAVERSE MECHANISM
Filed May 21, 1956
2 Sheets-Sheet 1
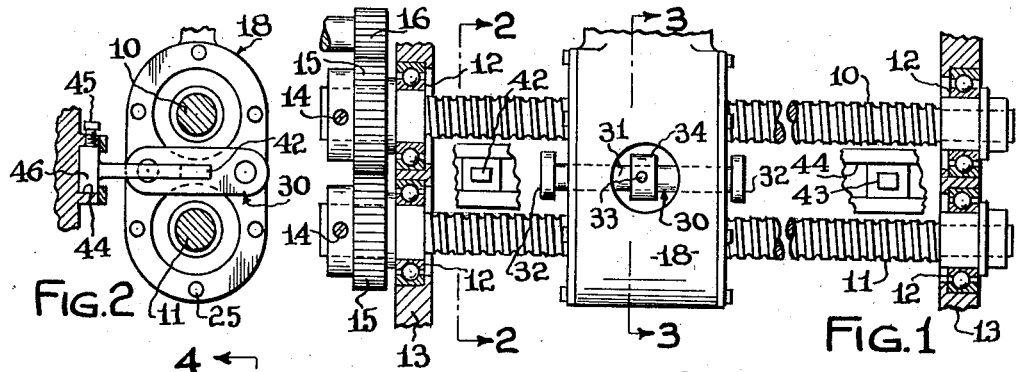
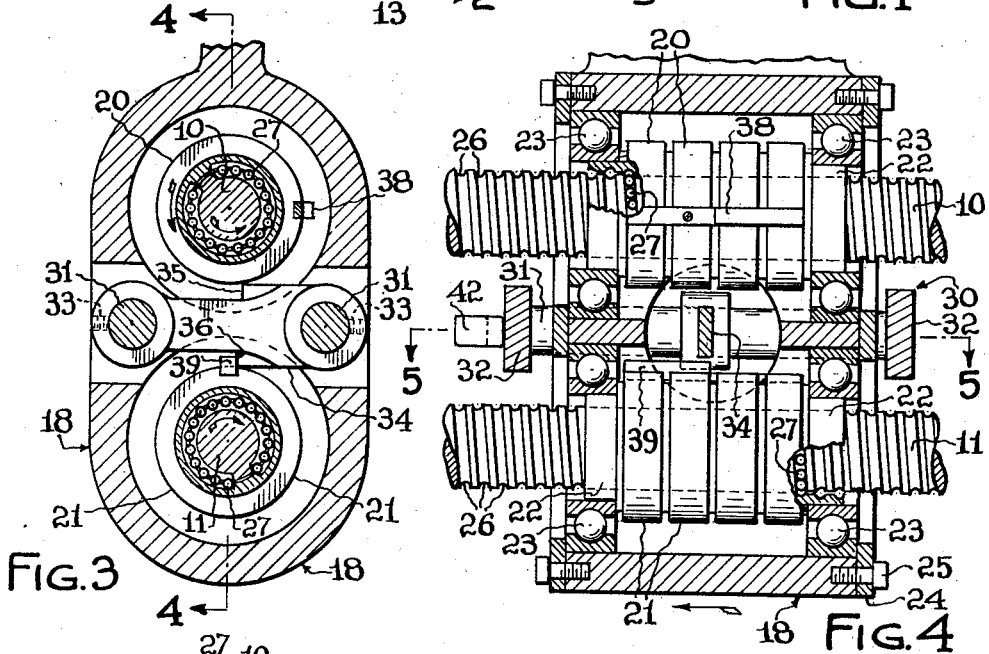
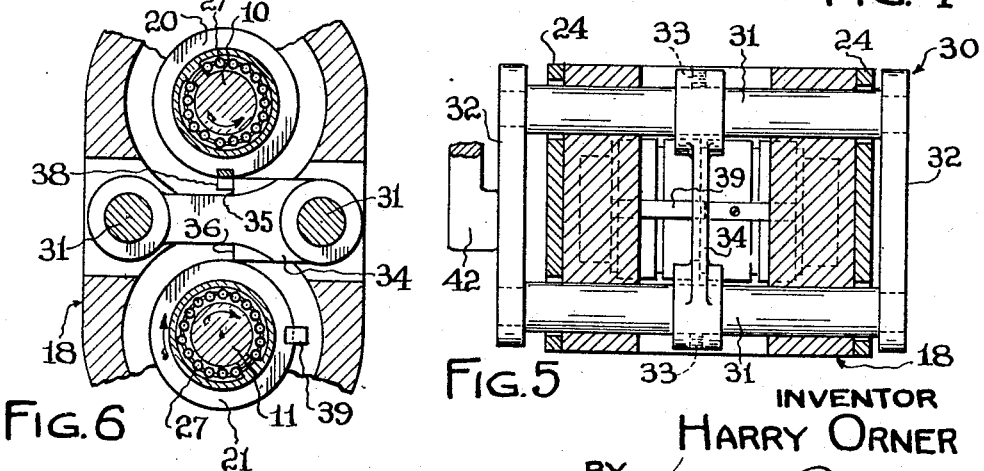
INVENTOR
HARRY ORNER
BY
ATTORNEY Oct. 6, 1959  H. ORNER  2,907,219
REVERSING TRAVERSE MECHANISM
Filed May 21, 1956  2 Sheets-Sheet 2

INVENTOR
HARRY ORNER
BY
ATTORNEY

United States Patent Office 2,907,219
Patented Oct. 6, 1959

2,907,219

REVERSING TRAVERSE MECHANISM

Harry Orner, Altadena, Calif.

Application May 21, 1956, Serial No. 586,040

20 Claims. (Cl. 74—58)

This invention relates to reversing traverse mechanisms and more particularly to a new and improved device of this type operable to convert unidirectional rotating motion into automatically reversing linear motion and wherein the linear motion in opposite directions occurs at the same or different speeds.

Traverse mechanisms are required in a great variety of applications having need for converting rotary motion to reciprocating motion under controlled conditions. Common examples include the driving mechanism for tool carriages on automatic lathes, planers, milling machines and the like. Frequently it is desired that the working or advance stroke be performed at a slow rate and that the non-working or return stroke be performed as rapidly as possible to reduce the time expenditure in the non-productive portion of the cycle. Traverse mechanisms heretofore proposed employ a single feed screw provided with a pair of conventional threads extending in opposite helical directions, and at the same or different pitches depending upon the relative speeds desired for the advance and return strokes. Associated with this screw and connected to drive the tool carriage is a split nut actuatable to engage one or the other of the oppositely extending threads to move the carriage in the desired direction. Such traverse mechanisms are subject to numerous disadvantages outstanding among which are low power-transmitting efficiency and limited adaptability to different operating requirements.

The present invention provides a traversing mechanism obviating both of the foregoing major disadvantages and others of lesser importance. In lieu of the single feed screw characteristic of former designs, this invention employs a pair of parallel lead screws and a carriage arranged to be driven selectively by one or the other of these screws depending on the direction of carriage movement desired. The coupling means between the carriage and each feed screw comprises separate high-efficiency ball-bearing nut devices each being releasable for rotation with one of the feed screws, or to be held against rotation, together with control means actuated by the position of the carriage to determine which one of the nuts is to be held in restraint. By locating stop means at the opposite ends of the desired path of travel suitable control mechanism is actuated to reverse the carriage automatically so long as the screws are driven from the power source. Rapid return of the carriage is obtainable in various ways as by the use of a higher pitch thread for the return drive screw than for the advance screw, or by rotating the return screw at a higher speed than the advance screw. Employing the latter technique, an extremely rapid return, impossible by the use of a higher pitch thread, is easily achieved.

It is a primary object of this invention to provide an improved traversing mechanism having a high operating efficiency and wherein numerous disadvantages of prior constructions are obviated.

A particular object of the invention is to provide a mechanism for converting rotary motion to linear motion by the utilization of a ball-bearing nut mechanism selectively restrained or permitted to rotate with respect to a driving screw to control the movement of a power transmitting means associated with the screw.

Another object of the invention is the provision of an automatically reversing traverse mechanism employing a pair of spaced-apart parallel-driven screws selectively operable to drive a carriage in different directions axially thereof depending upon which of a pair of ball-bearing nut mechanisms mounted on the screws is held against rotation.

Still another object of the invention is the provision of a reversing traverse mechanism operating with minimum frictional and hysteresis losses.

A further object of the invention is the provision of a traversing mechanism having independent drive means for shifting a carriage selectively in opposite directions depending upon which drive means is effective and wherein the separate drive means operate at different speeds.

Another object of the invention is the provision of a traversing mechanism wherein the control determining the direction of carriage movement remains in a neutral position unless forcibly moved to one of two positions to operate an advance-drive control or a return-drive control.

Still a further object of the invention is the provision of an automatic reversing traverse mechanism having adjustable control stops for determining the length of carriage travel.

These and other more specific objects will appear upon reading the following specification and claims and upon considering in connection therewith the attached drawings to which they relate.

Referring now to the drawings in which preferred embodiments of the invention are illustrated:

Figure 1 is a plan view of a traverse mechanism incorporating the present invention, parts being broken away to show certain details of the construction;

Figure 2 is a cross-sectional view taken on line 2—2 of Figure 1;

Figure 3 is a transverse sectional view through the carriage taken along line 3—3 on Figure 1;

Figure 4 is a transverse sectional view through the carriage taken along line 4—4 on Figure 3;

Figure 5 is a transverse sectional view through a portion of the control means for the carriage taken along line 5—5 on Figure 4;

Figure 6 is a fragmentary sectional view similar to Figure 3 but showing the control means in an alternate position to that shown in Figure 3;

Figure 7:
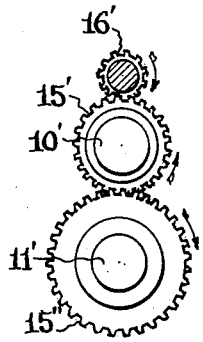
Figure 7 is a fragmentary end view of an alternate drive gear arrangement for driving the two lead screws at different speeds.

Referring to the drawings, and particularly to Figures 1 and 2, it will be seen that a reversing traverse mechanism according to a preferred embodiment of the invention comprises a pair of identical lead screws 10 and 11 suitably supported against endwise movement in pairs of ball bearings 12, 12 mounted in supporting frame members 13, 13. Adjustably secured to one end of each screw by set screws 14 are a pair of identical meshing spur gears 15 one of which is driven by a drive pinion 16. If pinion 16 rotates clockwise, gear 15 with which it meshes and screw 10 to which the latter is fixed will be rotated counterclockwise, while the second gear 15 and the screw 11 to which it is fixed will be rotated clockwise.

The tool carriage designated generally 18 comprises a generally elliptical-sectioned housing encircling the two lead screws 10 and 11 and is arranged to be displaced axially of those screws for the purpose of moving a cutting tool or performing a task requiring a to-and-fro motion. Encircling the lead screws are identical ball-bearing nut devices or mechanisms 20, 21 each being provided with an annular seat 22 at its opposite ends over which are firmly pressed the inner raceways of suitable anti-friction bearing assemblies 23, 23, the outer raceways of the latter are mounted in annular bores or recesses formed in the opposite ends of carriage 18. The outer raceways of bearing assemblies 23 may be clamped within the mounting recesses by end rings 24 and cap screws 25. It is to be understood that each of the ball-bearing nut devices 20, 21 comprises a plurality of individual nut units each of which may be either of the multiple or single-convolution type although they are preferably of the single-convolution type shown in my co-pending application for United States Letters Patent, Serial No. 559,283 entitled Ball-Bearing Screw and Nut Mechanism, filed January 16, 1956, now Patent S.N. 2,842,978. In devices of this type the helical groove 26 formed along the lead screw provides an arcuate inner raceway for an endless series of ball bearings 27, which are held in position as they roll along the groove 26 by a similar helical raceway formed on the interior surface of nut devices 20 and 21. Upon reaching the end of the passage formed by the groove 26 and the cooperating groove in the nut device, the balls enter a return passage in which they are returned to the opposite end of said passage. In the multiple-turn type of nut mechanism the balls encircle the lead screw a number of times before passing through a return passage formed in the bodies of nut devices, whereas in the single-convolution type the balls encircle the lead screw only once before passing through the return passage.

It will be recognized from the foregoing that the load imposed by the carriage 18 on lead screws 10 and 11 is supported by ball bearings and, in particular, that the nut devices 20 and 21 engage the lead screws by a multiplicity of ball bearings 27 and the carriage 18 by ball bearing assemblies 23, 23. It will also be understood that rotation of the lead screws does not, so long as devices 20 and 21 are free to rotate in their supporting bearings 23, act to move the carriage along the screws; instead, devices 20, 21 rotate with the respective screws on which they are mounted. However, should one nut device 20 or 21 be held against rotation while the other nut device remains free to rotate relative to its supporting screw, it will be apparent that carriage 18 will be forcibly driven in a direction determined by the direction of rotation of the screw upon which the held device is seated.

An effective control means selectively operable to effect the braking of the two nut devices 20 and 21 to control the direction and reversal of direction of movement of the carriage will now be described. As shown, the combined control and reversing device comprises a generally rectangular loop 30 having a pair of parallel rails 31 slidably supported in openings extending transversely through the housing of carriage 18 and having their outer ends rigidly connected by side links 32. Adjustably secured, as by set screws 33, on guide rails 31 is a stop member 34 having a pair of shoulders 35, 36 on the opposite lateral edges thereof positioned to engage either one of a pair of keys 38, 39 rigidly secured to the outer peripheries of nut devices 20 and 21, respectively. By reference to Figure 4 it will be noted that keys 38 and 39 extend in opposite directions from stop member 34 and that their adjacent ends terminate in substantially the same vertical plane midway between the opposite ends of nut devices 20 and 21. It will therefore be apparent that the movement of control loop 30 axially of guide rails 31 is effective to position one or the other of shoulders 35, 36 to engage one of the keys 38, 39. It will be understood that the width of stop member 34 is preferably less than one half the pitch of the helical grooves 26 in the lead screws and that a sliding movement of control loop 30 along its guide rails 31 by this pitch distance suffices to shift the stop member from engagement with one key member into engagement with the other key member.

The means for automatically shifting control loop 30 from a position arresting the rotation of one nut device to a position releasing that device and arresting the rotation of the other nut device comprises a pair of rigid stop fingers 42 and 43 each adjustably supported in a stationary grooveway 44 by set screws 45. Stop fingers 42 and 43 are best illustrated in Figures 1 and 2 wherein it will be noted that their T-shaped heads 46 are held captive within the C-shaped grooveway 44. Grooveway 44 is formed in a stationary part of the machine to one side of screws 10 and 11 and midway therebetween so that the free ends of fingers 42 and 43 lie in the path of end links 32, 32 of control loop 30.

In the operation of the embodiment illustrated in Figures 1 to 6, let it be assumed that the parts are in the position shown in Figure 1 and that drive pinion 16 is rotating clockwise to rotate lead screw 10 counterclockwise and lead screw 11 clockwise. Since control loop 30, as shown in Figure 4, is shifted to the left, shoulder 36 of stop member 34 is in engagement with key 39 thereby preventing rotation of nut device 21 in a clockwise direction with screw 11. Under these conditions key 38 secured to nut device 20 will lie to the right of stop member 34; accordingly, nut device 20 will be free to rotate counterclockwise about screw 10, the speed of its rotation being double the speed of rotation of screw 10. Arresting the rotation of nut device 21 renders screw 11 effective to drive carriage 18 to the left as viewed in the drawings, this movement continuing smoothly and under the force available through a screw-type drive until control loop 30 contacts the reversing stop finger 42. Stop finger 42 is effective to shift control loop 30 to the right to move shoulder 36 out of engagement with key 39 on nut device 21 and to move shoulder 35 into the path of key 38 on nut device 20. During the shift of loop 30, nut device 21 and to move shoulder 35 into the path of key key abuts shoulder 35 whereupon its rotation will be arrested to render screw 10 effective through nut device 30 to reverse the direction of travel of carriage 18 and power drive it to the right. This movement of the carriage to the right continues until connecting link 32 of control loop 30 strikes stop finger 43 and shifts loop 30 to the position illustrated in Figures 1 and 4 to reverse the direction of movement of the carriage to the left.

Having the foregoing general description of the operation in mind, an explanation of certain details and refinements of the operation and of the mechanism generally will be given. Assuming that the position of the parts is as illustrated in Figures 3 and 4, it will be evident that screw 11 is effective to drive the carriage to the left, the axial displacement of the carriage for each revolution of the screw being equal to the pitch of screw 11. Since nut device 20 on screw 10 is free to rotate and is being moved to the left along with carriage 18 it follows that the speed of rotation of the nut drive 20 will be double that of screw 10. Accordingly, there is a definite relationship between the thickness of stop member 34, the pitch of screws 10 and 11 and the angular disposition of keys 38 and 39 relative to their respective supporting screws as well as to one another. Stated differently, it is essential that the width of key 34 be such that it has sufficient time to move out of arresting contact with one key before moving into arresting relation to the key on the other nut device. If the thickness of member 34 is made somewhat less than one-fourth the pitch of screws 10 and 11 it will be apparent that no interference will result as member 34 moves out of engagement with one key and into the path of the other.

Further assurance of non-interference is provided by locating keys 38 and 39 more than 180 degrees but less than 360 degrees apart. Referring to Figure 4 it will be noted that the counterclockwise rotating key 38 on nut 20 must rotate 270 degrees before coming into alignment with shoulder 35 on stop member 34. Since the thickness of member 34 is less than one-fourth the pitch of the screw 10 it follows that member 34 can be shifted out of engagement with key 39 and into the path of key 38 in somewhat less than 180 degrees or appreciably less than 270 degrees. The difference between 180 and 270 represents a dwell period in which both nut 20 and nut 21 are free to rotate with their respective supporting screws and during which carriage 18 is not driven in either direction. Accordingly, the angular position of key 38 between 180 degrees and 270 degrees is a measure of this dwell period, this dwell period being adjustable at the option of the operator merely by loosening the set screw between the hub of gear 15 or gear 16 and rotating the gear slightly relative to its supporting screw to change the angular positions of keys 38 and 39. Once the new adjustment has been obtained the set screw is tightened to lock the various parts of the mechanism in the new predetermined relative positions. Movement of screw 10 relative to gear 15 in a direction to decrease the angular position of key 38 will decrease the period of dwell between reversals in the movement of carriage 18 whereas increasing the angular position toward 360 degrees will increase the dwell period.

For certain applications it may be desirable to increase the speed at which control loop 30 is shifted to effect a reversal of carriage movement in less than one revolution of lead screws 10 and 11. While this may be accomplished in numerous ways one simple expedient makes use of separate bell cranks pivoted on stop fingers 42 and 43, respectively. The longer arm of each bell crank is positioned to contact end links 32, 32 of control loop 30 and the short arms are positioned to contact the end of carriage 18. Accordingly, a relatively small movement of the carriage will produce a greater movement of control loop 30 and reverse carriage 18 in a shorter period of time. This arrangement has the advantage of increasing the dwell period which is advantageous particularly under conditions of high inertia loads where a longer time interval facilitates the absorption of shock energy accompanying reversal of the carriage.

In other applications, a minimum permissible dwell period is desirable, this objective being obtainable by suitably adjusting drive gears 15 and 16 relative to one another on screws 10 and 11 in the manner described above. The dwell period can be reduced even further by providing a simple over-center shifting mechanism in which the first shifting movement of control loop 30 is utilized to load a spring device to a critical point following which the energy so stored is employed to complete the shifting operation with a snap action. Since devices of this type are well known to mechanics, it is not deemed necessary to provide an illustrative example in the drawings. Reference may be made, however, to a typical device of this type such as the common spring-pressed ball detent arranged to seat in either of two recesses separated by a knife edge.

The traverse mechanism hereinabove described is formed from precision parts movable relative to one another but mechanically interlocked so that for a given position one part has a fixed relationship to all other parts of the device. For example, for every repeat position of carriage 18, all other parts of the device will lie in identical relative positions to one another and to carriage 18. The length of travel of carriage 18 can be readily adjusted by the proper positioning of stop fingers 42 and 43 along grooveway 44. Also, the dwell period between the driving movement of carriage 18 in one direction and its reversal for power drive in the opposite direction is determined by the angular position of keys 38 and 39 relative to one another. This dwell period is conveniently adjusted as indicated above merely by adjusting gears 15 and 16 relative to one another on screws 10 and 11.

Figure 8:
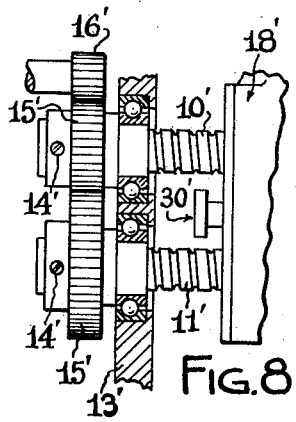
Figure 8 is a fragmentary plan view of a traverse mechanism employing the drive gear arrangement illustrated in Figure 7.

A second embodiment of the invention is illustrated in Figures 7 and 8 wherein the same or similar elements to those described above will be designated by the same numeral distinguished by the addition of a prime. It will be noted that the only change involves the replacement of the identical gears 15 in the first embodiment with gears 15' and 15'' of different diameters to the end that lead screw 10' will be driven at a higher speed than lead screw 11'. In consequence carriage 18' is driven toward the left as viewed in Figure 8, by lead screw 11', at a slower speed than it is driven to the right by lead screw 10'. By properly selecting the relative sizes of drive gears 15', 15'', carriage 18' can be driven slowly during its advance stroke and returned under no load at any desired higher rate of speed. This dual rate of drive is advantageous in many machine tool applications. It is to be understood that the reversing traverse mechanism shown in Figures 7 and 8 is provided with reversing control mechanism of any suitable type such as that described above in connection with Figures 1 to 6.

Figure 9:
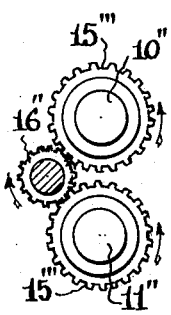
Figure 9 is a fragmentary end view of a third embodiment of a traverse mechanism employing a different gear arrangement for driving two lead screws having helical grooves of different pitches.
Figure 10:
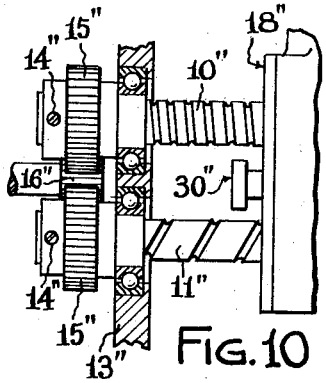
Figure 10 is a fragmentary side elevational view of the third embodiment.

An alternate mode of driving the carriage at different rates during its advance and return strokes is illustrated in Figures 9 and 10 wherein lead screws 10'' and 11'' have helical threads or grooves differing widely in pitch. Additionally, the helical grooves encircle the two screws in opposite directions owing to the fact that these screws are rotated in the same direction by two spur gears 15''', 15''' driven by a drive pinion 16''. Due to the long pitch of the groove on screw 11'', carriage 18'' advances to the left rapidly as compared to its speed in the opposite direction determined by the short pitch of the groove on screw 10''. In all other respects the operation of the embodiment shown in Figures 9 and 10 is similar to those described above.

Figure 12:
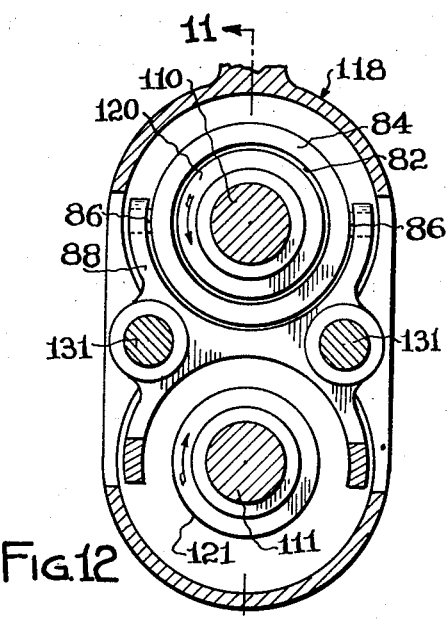
Figure 12 is a transverse sectional view taken along line 12—12 on Figure 11 and showing certain details of the control mechanism.
Figure 11:
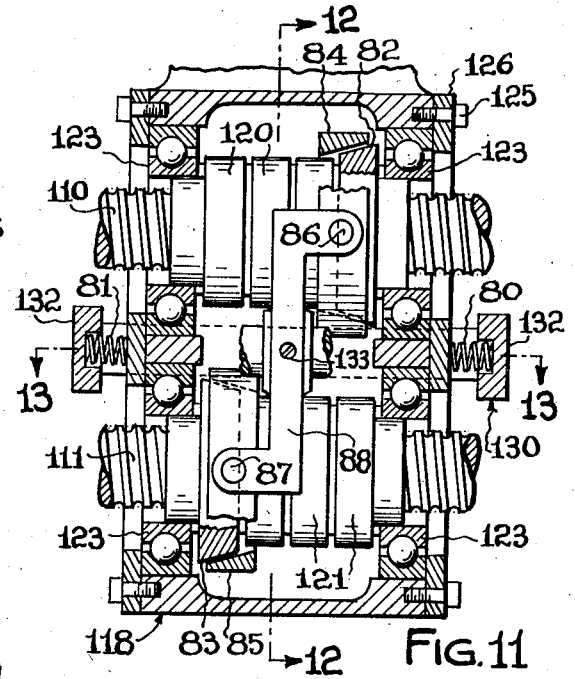
Figure 11 is a transverse sectional view through a modified carriage employing an alternate control mechanism.
Figure 13:
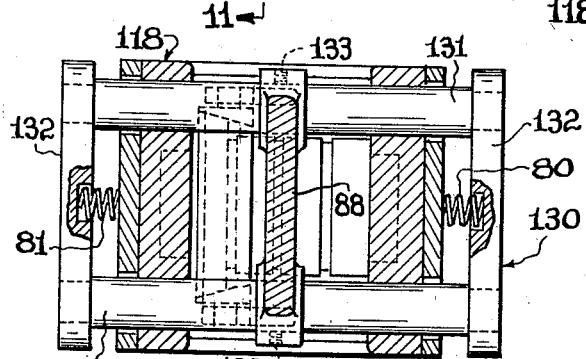
Figure 13 is a sectional view through the control mechanism taken along line 13—13 on Figure 11.

Referring now to Figures 11 through 13 illustrating still another embodiment of the invention, it will be observed that the same or similar parts to those described in connection wtih Figures 1 to 6 have been designated by the same reference characters distinguished by the addition of the numeral 1 in front thereof. Since this embodiment is similar in all respects to that described in connection with Figures 1 to 6, except for certain changes in the carriage 118 and the control means 30, only the modified features have been illustrated.

It will be observed that the ball-bearing screw mechanisms 120 and 121 encircling their respective similar drive screws 110 and 111 have their opposite ends journaled in anti-friction bearings 123, the outer raceways of which are fixedly mounted in the carriage 118. The control loop 130 is similar in all respects to the corresponding device 30 in the first embodiment except that its sliding movement transversely of carriage 118 is opposed by two identical compression springs 80 and 81 interposed between the end walls of carriage 118 and a recess in the central portions of side links 132 of control device 130. Accordingly, control device 130 is maintained in a central or neutral position for a purpose which will appear presently. Rigidly fixed to the opposite ends of nut devices 120 and 121, respectively, are a pair of inner cones 82 and 83 adapted to mate, respectively, with a pair of outer rings 84, 85 provided with diametrically spaced pairs of trunnions 86, 87, respectively, by which they are pivotally supported on their opposite sides at the opposite ends of S-shaped supporting bracket 88 rigidly mounted upon the spaced rails 131 of control loop 130 and extended therebetween.

In the normal position of the parts illustrated in Figure 11, springs 80, 81 are effective to hold loop 130 in a neutral position in which the rings 84, 85 are disengaged from cones 82 and 83. Under these conditions the nut mechanisms 120 and 121 are free to rotate with lead screws 110 and 111, respectively, and carriage 118 remains stationary. Any suitable device, not shown, such as a lever fixed either to member 88 or control loop 130 can be employed to move loop 130 to the right or to the left to engage either clutch device. If brake members 82 and 84 are brought into engagement the rotation of nut device 120 is arrested and carriage 118 is driven to the right provided screw 110 is being rotated counterclockwise as viewed from the left in Figure 11. If, on the other hand, the control mechanism is shifted to the left to engage members 83 and 85, the rotation of the freely rotating nut 121 is arrested and screw 111 is effective to shift carriage 118 to the left so long as the brake elements are engaged. Immediately upon release of the pressure applied to engage one or the other of the brakes, springs 80, 81 are effective to disengage the brake and maintain both brakes in their neutral positions such that nuts 120 and 121 rotate on their respective screws and are accordingly ineffective to move the carriage in either direction.

In the last-described embodiment it will be apparent that the dwell period between movement of the carriage in opposite directions is determined by the gap between the two brake members and the time period required to disengage one brake and engage the other. As will be appreciated, this time interval can be extremely small. This embodiment of the invention is particularly suitable for use as a power steering mechanism in which the usual steering wheel is coupled to control means 130 for the two brakes. As the operator turns the steering wheel in one direction, pressure is applied to overcome one of the springs and engage one brake to drive carriage 118 in a direction to move the front vehicle wheels under power in the direction desired. Likewise movement of the steering wheel in the opposite direction immediately reverses the direction of power movement applied to the front wheels. So long as no rotative pressure is applied to the steering wheel springs 80, 81 oppose each other to maintain the vehicle wheels in the position to which they were forcibly moved by the power-applying means. It will also be apparent that the last-described mechanism is particularly useful in any application in which it is desired to convert a low power input into a power output in opposite directions under accurate and precisely controlled conditions.

While the particular automatically reversing traverse mechanism herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a reversing traverse mechanism of the type having a pair of driven screws arranged parallel to one another, a carriage extending between and movable axially relative to said screws, said screws each having a ball bearing nut device mounted thereon operable to impart linear movement to the carriage relative to said screws when one nut mechanism is held against rotation with respect to its supporting screw, that improvement which comprises control means for selectively arresting rotation of said nut devices, said control means including an abutment member slidably supported on said carriage adjacent said nut devices and having stop means thereon having an axial movement with respect to said screws appreciably less than the pitch of said screws, and cooperating detent means on each of said nut devices positioned to engage one only of said stop means to arrest the rotation of the associated nut device and reverse the direction of movement of said carriage relative to said screws.

2. In a reversing traverse mechanism as defined in claim 1 including stationary stop means extending into the path of movement of said control means for shifting the same out of engagement with the detent means of one nut and into engagement with the detent means of the other nut as the carriage is driven to a predetermined position relative to said screws thereby effecting a reversal in the direction of movement.

3. In a reversing traverse mechanism as defined in claim 2 including a pair of stationary stop means adjacent either end portion of said screws, and means for adjusting said last-mentioned stops to different positions along said screws to thereby change the length of the carriage travel relative to said screws.

4. In combination, a traverse mechanism comprising a pair of parallel driven screws each having a helical ball-seating groove, stationary means supporting said screws for rotation about the longitudinal axes thereof, means for rotating said screws, a carriage adapted to be moved in either direction axially relative to said screws on ball bearing nut means supported by said screws through an intervening closed circuit of recirculating balls, brake means connected with said carriage and operatively associated with each of said nut means, and brake control means selectively operable to control the relative rotation of said nut means to render a particular one of said screws operable to drive said carriage in a predetermined direction axially thereof, said brake control means including means for arresting rotation of said nut means by the application of balanced forces ineffective to shift the nut means laterally of its own axis thereby avoiding the imposition of a lateral load on either screw.

5. The combination defined in claim 4 wherein said brake means includes a pair of independent brakes associated with said screws, one brake being operable when engaged to effect the movement of said carriage in one direction and the other brake being operable when engaged to effect the movement of said carriage in the opposite direction.

6. The combination defined in claim 5 wherein said brake control means includes spaced apart stop means positioned in the path of travel of said carriage operable to actuate said control means as the carriage reaches a preselected position to disengage one brake and engage the other brake.

7. The combination defined in claim 4 including means positioned to either side of said carriage in the path of travel thereof lengthwise of said screws which means is engageable with said brake control means to reverse the position thereof automatically thereby disengaging the brake action on one of said nut means and engaging the braking action on the other of said nut means to reverse the travel of said carriage along said screws.

8. The combination defined in claim 4 wherein said helical ball-seating grooves in said screws are of different pitches whereby said screws are operable to drive said carriage in opposite directions at different speeds.

9. The combination defined in claim 4 including drive means for said screws, said drive means including means for driving one screw at a different speed than the other screw whereby said carriage is driven faster in one direction than in the opposite direction.

10. In a mechanism of the type disclosed, rotatably supported screw means including a screw having a helical ball-seating groove, ball bearing nut means concentrically mounted on said screw means, means supporting a carriage for linear movement axially of said screw means which carriage movement is dependent on the rotating and non-rotating condition of said nut means relative to said screw means, and means for controlling the rotation of said nut means relative to said screw means including means for restraining said nut means against relative rotation while maintaining the concentric relationship of said screw and nut means and without tending to deflect said screw relative to its longitudinal axis.

11. In combination, an automatically reversing traverse mechanism comprising, a pair of parallel drive screws having a helical ball seating groove, stationary means rotatably supporting said screws in parallel relation, carriage means embracing a portion of said screws and movable axially relative thereto, ball bearing nut devices rotatably supported by the helical grooves of said drive screws, anti-friction bearing means supporting said carriage from said nut devices and normally permitting said nut devices to rotate with the screw on which each is mounted, control means mounted on said carriage and selectively engageable with either of said nut devices to prevent the rotation thereof with its supporting screw whereby said screw is effective to move said carriage in a predetermined direction axially thereof, said control means including means supported on said carriage and positioned to engage stop means spaced to either side thereof lengthwise of said screw, said stop means being operable on contact with said control means to release one of said nut devices for rotation and to prevent the rotation of the other of said nut devices for any desired period for the purpose of effecting sustained reverse movement of said carriage lengthwise of said screws.

12. In combination, an automatically reversing traverse mechanism comprising, a pair of parallel drive screws having a helical ball seating groove, stationary means rotatably supporting said screws in parallel relation, carriage means embracing a portion of said screws and movable axially relative thereto, ball bearing nut devices rotatably supported by the helical grooves of said drive screws, anti-friction bearing means supporting said carriage from said nut devices and normally permitting said nut devices to rotate with the screw on which each is mounted, means for rotating each of said screws simultaneously, and control means mounted on said carriage and selectively engageable with either of said nut devices to prevent the concurrent rotation thereof along with its supporting screw by a restraining force acting tangentially of said nut and in a manner avoiding the application of a bending stress on said screw, whereby said screw is effective to move said carriage in a predetermined direction axially thereof.

13. A traverse mechanism comprising a pair of parallel power-driven screws each having a helical ball seating groove, carriage means supported for linear movement relative to said screws, separate ball bearing nut devices encircling said screws and rotatably supported in said carriage, control means movably supported on said carriage and including means for arresting rotation of one of said nut devices by a restraining force acting tangentially of said nut devices and in such manner as not to deflect the associated screw laterally of its axis when said control means is moved in one direction relative to said carriage and for releasing said last-mentioned nut device and arresting the rotation of the other nut device when said control means is moved in the opposite direction.

14. A traverse mechanism as defined in claim 13 including means biasing said control means to a neutral position wherein it is ineffective to arrest the rotation of either of said nut devices.

15. A traverse mechanism as defined in claim 13 including a pair of springs arranged in opposition to one another between said control means and said carriage, said spring means being effective in the absence of an opposing force to hold said control means in a position wherein both of said nut devices are free for rotation along with their respective supporting screws.

16. A reversing traverse mechanism comprising a pair of parallel screws each having a helical ball seating groove, a carriage supported for movement in opposite directions relative to said screws through separate drive connections with a different one of said screws, said drive connections each including a ball bearing nut device encircling said screw and supported thereon through a closed circuit of circulating balls, and means for selectively rendering one or the other of said screws effective to drive said carriage depending upon the direction of relative carriage and screw movement desired, said last-mentioned means including means for controlling the rotation of said nut devices without tending to deflect either screw relative to the other screw.

17. A reversing traverse mechanism as defined in claim 16 including means movable with said carriage and operable on contact with a stop to disengage one of said driving connections from driving relation with said carriage and to effect engagement of the other drive connection to drive said carriage in the opposite direction.

18. A traverse mechanism comprising a pair of driven screws rotatably supported in parallel relation, a ball bearing nut device mounted on each of said screws for rotation therewith, a carriage arranged to be driven by each of said screws through the particular nut device on each screw, control means for selectively rendering one of said nut devices at a time effective to drive said carriage, said control means including inter-engageable means between said nut device and said control means selectively operable to arrest rotation of the nut device by restraining force applied tangentially to said nut device thereby to avoid the application of a radial load on the screw tending to deflect the screw laterally of its longitudinal axis.

19. A traverse mechanism as defined in claim 18 wherein said control means includes means normally biasing the same to a position wherein both of said screws are ineffective to drive said carriage, said control means being movable in one direction to render one screw effective to drive said carriage and being movable in a different direction to render the other screw effective to drive said carriage.

20. In a mechanism of the type disclosed, rotatably supported screw means including a screw having a helical ball-seating groove, ball bearing nut means concentrically mounted on said screw means, means supporting a carriage for linear movement axially of said screw means which carriage movement is dependent on the rotating and non-rotating condition of said nut means relative to said screw means, means for controlling the rotation of said nut means relative to said screw means, said means for controlling movement of said carriage including means supported to move with said carriage and selectively operable to arrest and to permit relative rotation of said nut means relative to said screw means while avoiding the application of a force acting on said screw means in a manner to bow the screw means transversely of its axis intermediate the ends thereof.

References Cited in the file of this patent

UNITED STATES PATENTS

| | | |
|---|---|---|
| 1,276,810 | Ragan | Aug. 27, 1918 |
| 1,826,758 | Field | Oct. 13, 1931 |
| 1,942,189 | Shepard | Jan. 2, 1934 |
| 2,616,302 | Wahlmark | Nov. 4, 1952 |
| 2,674,899 | Gobereau | Apr. 13, 1954 |
| 2,742,791 | Hauber | Apr. 24, 1956 |

UNITED STATES PATENT OFFICE
CERTIFICATE OF CORRECTION

Patent No. 2,907,219 October 6, 1959

Harry Orner

It is hereby certified that error appears in the printed specification of the above numbered patent requiring correction and that the said Letters Patent should read as corrected below.

Column 4, line 54, strike out the entire line and insert instead -- device 20 continues to rotate counterclockwise until the --.

Signed and sealed this 5th day of April 1960.

(SEAL)
Attest:

KARL H. AXLINE
Attesting Officer

ROBERT C. WATSON
Commissioner of Patents